US012631912B2

(12) United States Patent (10) Patent No.: US 12,631,912 B2
Iwai et al. (45) Date of Patent: May 19, 2026

(54) OPTICAL SWITCH ELEMENT, OPTICAL SWITCH DEVICE, OPTICAL COMMUNICATION SYSTEM, AND OPTICAL COMPUTER

(71) Applicants: TOHOKU UNIVERSITY, Sendai (JP); CHUO UNIVERSITY, Tokyo (JP)

(72) Inventors: Shinichiro Iwai, Sendai (JP); Yohei Kawakami, Sendai (JP); Tatsuya Amano, Sendai (JP); Kenya Ohgushi, Sendai (JP); Kenji Yonemitsu, Tokyo (JP)

(73) Assignees: TOHOKU UNIVERSITY, Sendai (JP); CHUO UNIVERSITY, Tokyo (JP)

( * ) Notice: Subject to any disclaimer, the term of this patent is extended or adjusted under 35 U.S.C. 154(b) by 455 days.

(21) Appl. No.: 18/265,360

(22) PCT Filed: Dec. 2, 2021

(86) PCT No.: PCT/JP2021/044368
§ 371 (c)(1),
(2) Date: Jun. 5, 2023

(87) PCT Pub. No.: WO2022/124205
PCT Pub. Date: Jun. 16, 2022

(65) Prior Publication Data
US 2024/0111181 A1    Apr. 4, 2024

(30) Foreign Application Priority Data
Dec. 8, 2020    (JP) ................................. 2020-203352

(51) Int. Cl.
*G02F 1/09*        (2006.01)
*H04Q 11/00*      (2006.01)

(52) U.S. Cl.
CPC ........... *G02F 1/09* (2013.01); *H04Q 11/0005* (2013.01); *H04Q 2011/0007* (2013.01)

(58) Field of Classification Search
CPC ......... G02F 1/3511; G02F 1/3515; G02F 1/09
See application file for complete search history.

(56) References Cited

FOREIGN PATENT DOCUMENTS

JP        09-146058 A      6/1997
JP        2008-135480 A    6/2008
(Continued)

OTHER PUBLICATIONS

Pavlov, Viktor Vladimirovich. "Linear and Nonlinear Magneto-Optical Phenomena in Epitaxial Films of Europium Chalcogenides EuX (X=O, Se, Te)." Physics of the Solid State 61.3 (2019): 408-413 (Year: 2019).*
(Continued)

*Primary Examiner* — Christopher Stanford
(74) *Attorney, Agent, or Firm* — Sughrue Mion, PLLC

(57) ABSTRACT
An object of the present invention is to provide an optical switch element, an optical switch device, an optical communication system, and an optical computer capable of operating even in a temperature range higher than the Néel temperature. An optical switch element (10) according to the present invention includes a substance including a plurality of transition metal elements having electrons in d-orbitals, and a plurality of anions arranged around each of the plurality of transition metal elements, in which the plurality of transition metal elements are arranged in a lattice form, $t_{2g}$-orbitals into which the d-orbitals of each of the plurality of transition metal elements are split are connected annularly, and in a state in which the substance does not have a long-range magnetic order, the polarization of signal light (L1) is rotated when control light (C1) is applied.

7 Claims, 8 Drawing Sheets

(56)                    References Cited

FOREIGN PATENT DOCUMENTS

JP          2009-538490  A      11/2009
WO          2007/136243  A1     11/2007

OTHER PUBLICATIONS

Versteeg, R. B., et al. "Nonequilibrium quasistationary spin disordered state in the Kitaev-Heisenberg magnet $\alpha$-RuCl $_3$." arXiv preprint arXiv:2005.14189 (2020). (Year: 2020).*

Usachev, Pavel Anatol'evich, V. N. Katz, and Viktor Vladimirovich Pavlov. "Photo-induced magneto-optical Kerr effect in europium sulfide EuS." Physics of the Solid State 62.9 (2020): 1619-1623. (Year: 2020).*

Tian, Yingzhen, et al. "Optically driven magnetic phase transition of monolayer RuCl3." Nano Letters 19.11 (2019): 7673-7680. ( Year: 2019).*

Luke J. Sandilands, "Spin-orbit excitations and electronic structure of the putative Kitaev magnet $\alpha$-RuCl3", Physical Review B 93, 2016, pp. 075144-1 through 075144-7.

T. Amano, et al., "Ultrafast spin dynamics of Kitaev spin liquid candidate $\alpha$-RuCl3: II", Meeting Abstracts of the Physical Society of Japan, Mar. 23, 2020, 18pE25-4, 2 pages, vol. 75, No. 1.

Daichi Hirobe, et al., "Magnetic thermal conductivity far above the Neel temperature in the Kitaev-magnet candidate $\alpha$-RuCl3", Physical Review B, Jun. 22, 2017, pp. 241112 (1-6), vol. 95.

International Search Report for PCT/JP2021/044368 dated Feb. 22, 2022 (PCT/ISA/210).

\* cited by examiner

[FIG. 1]
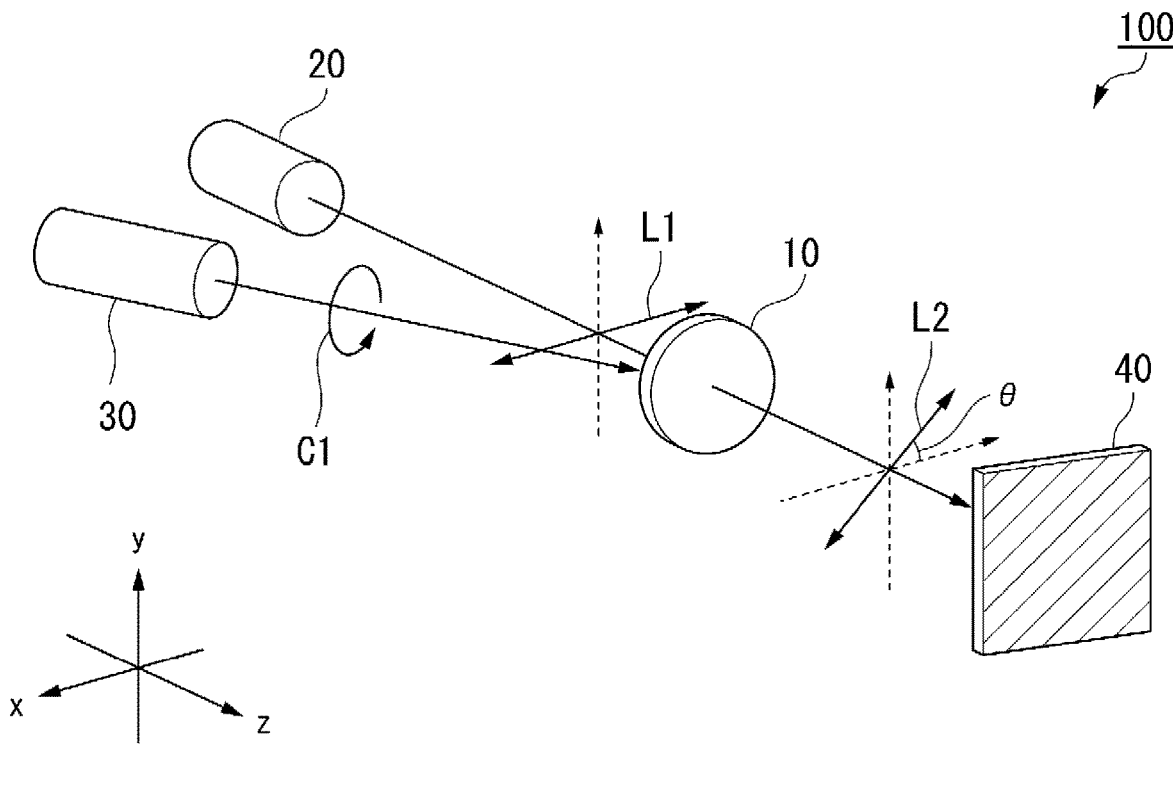
[FIG. 2]
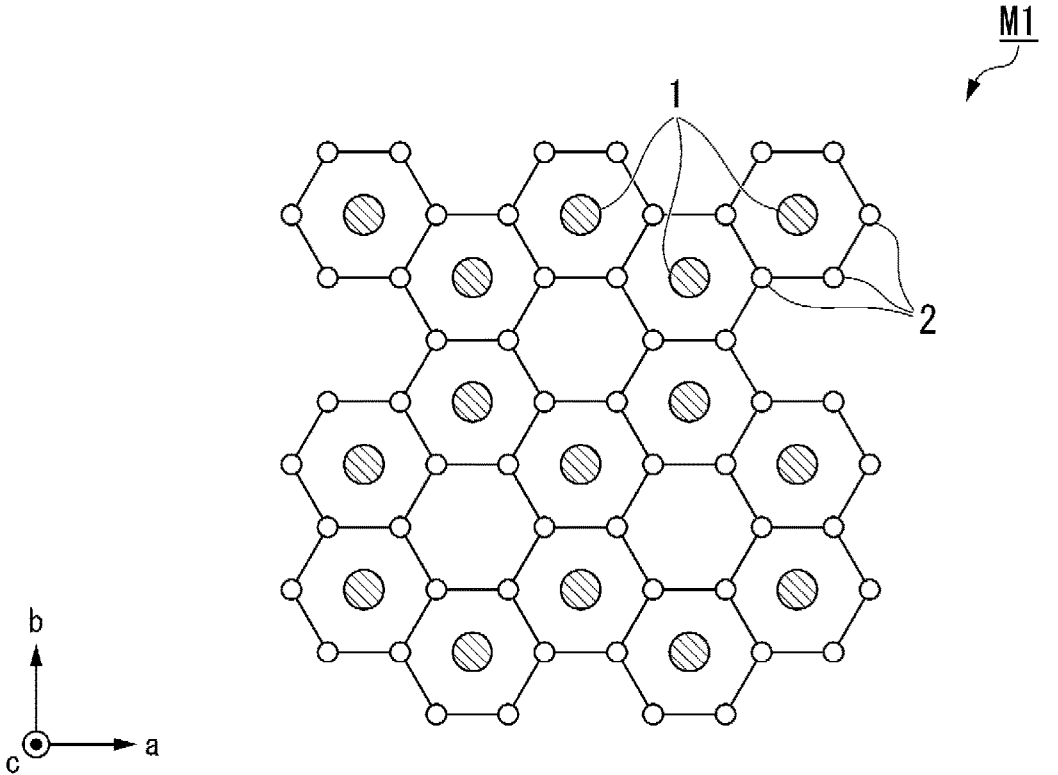

[FIG. 3]
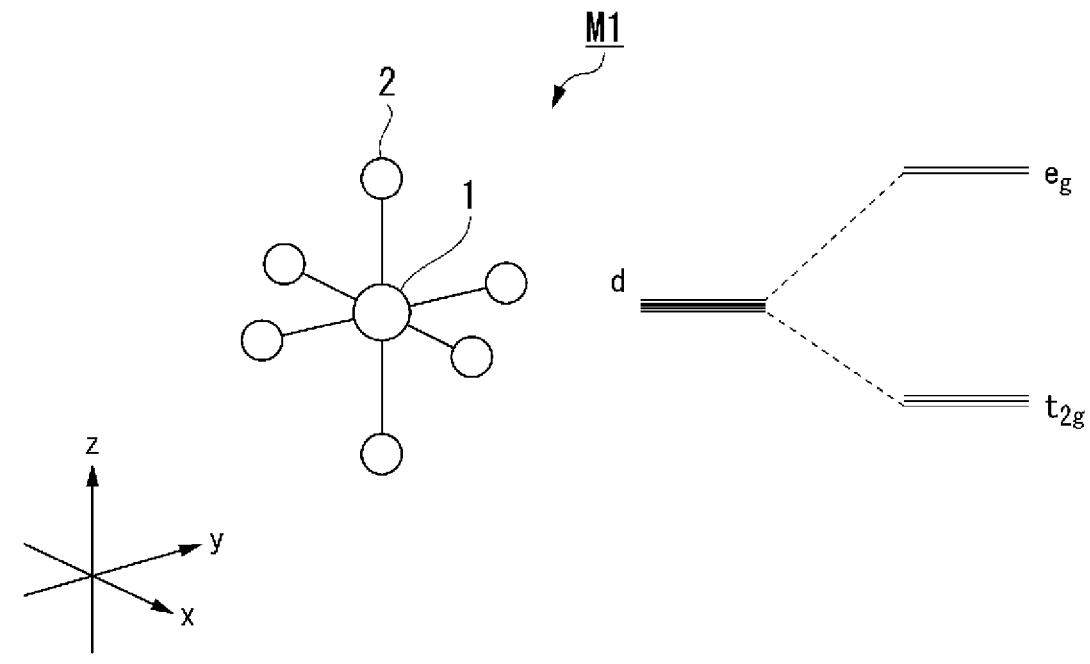
[FIG. 4]
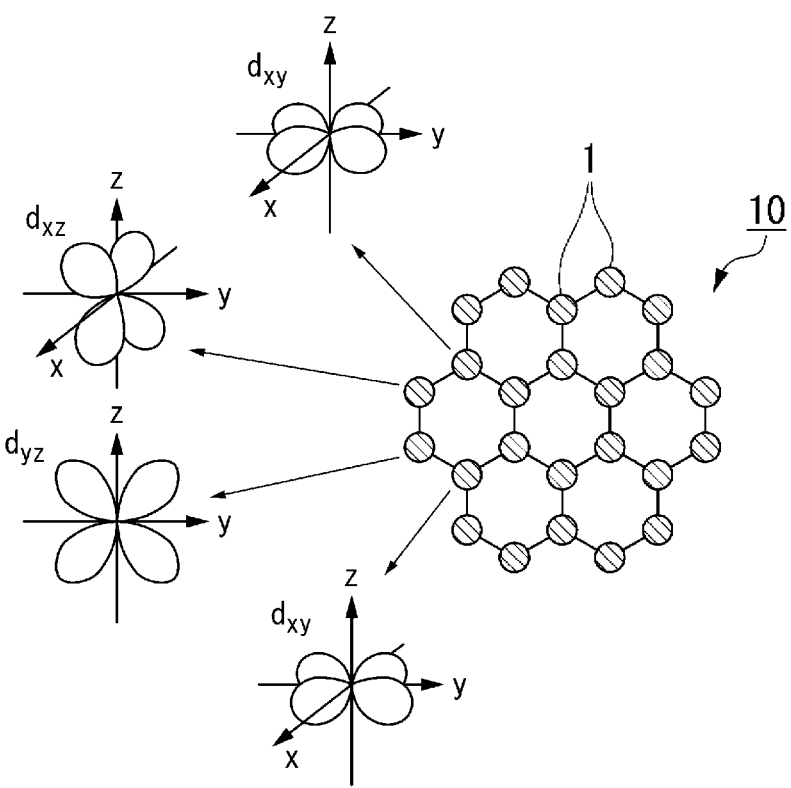

[FIG. 5]
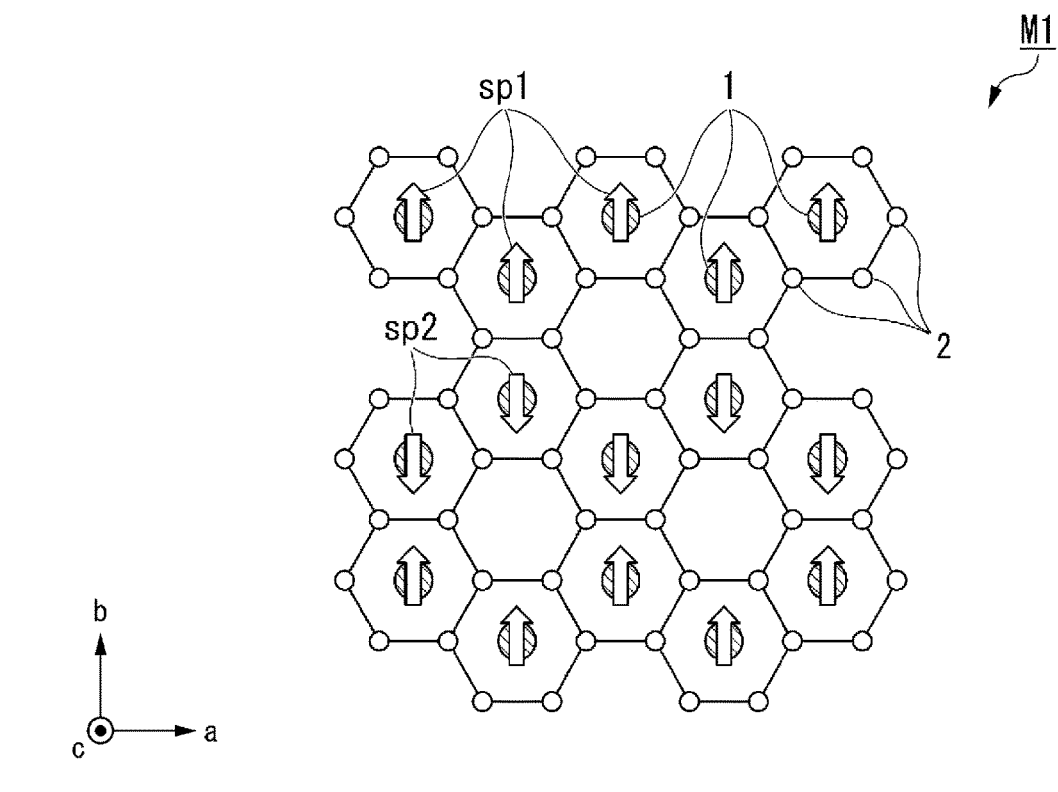
[FIG. 6]
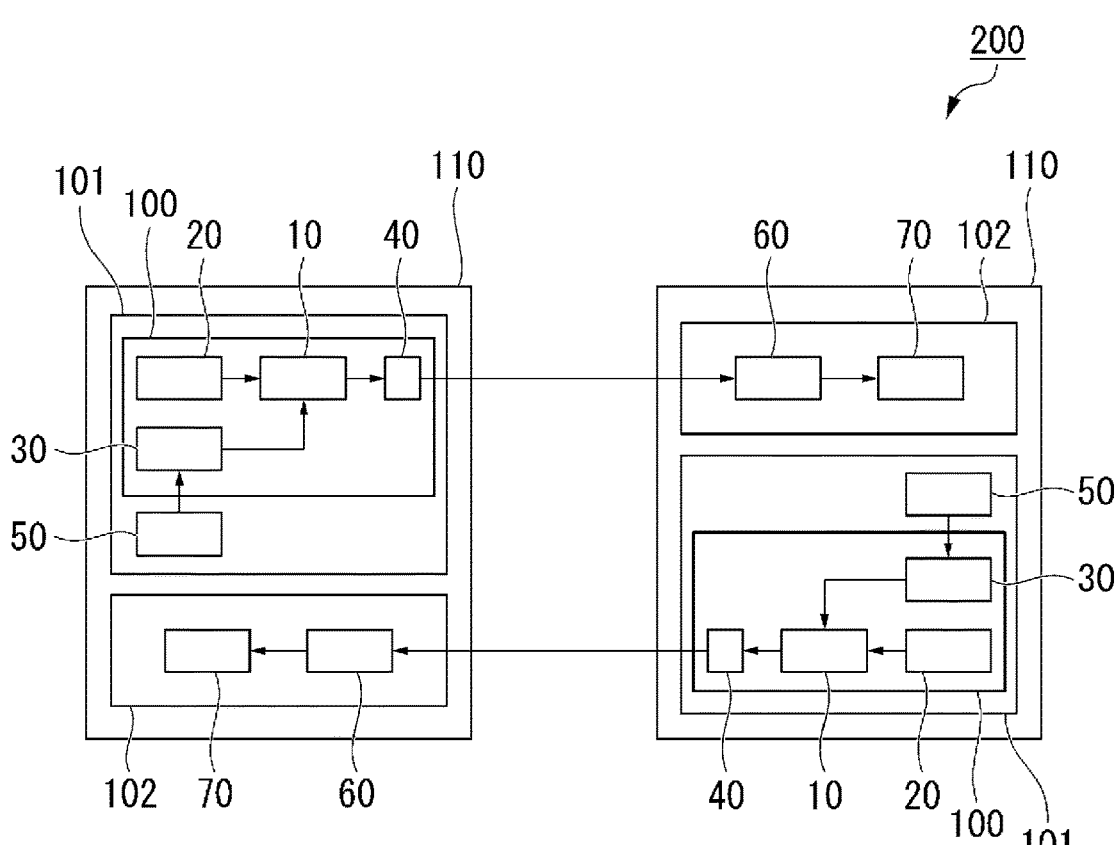

[FIG. 7]
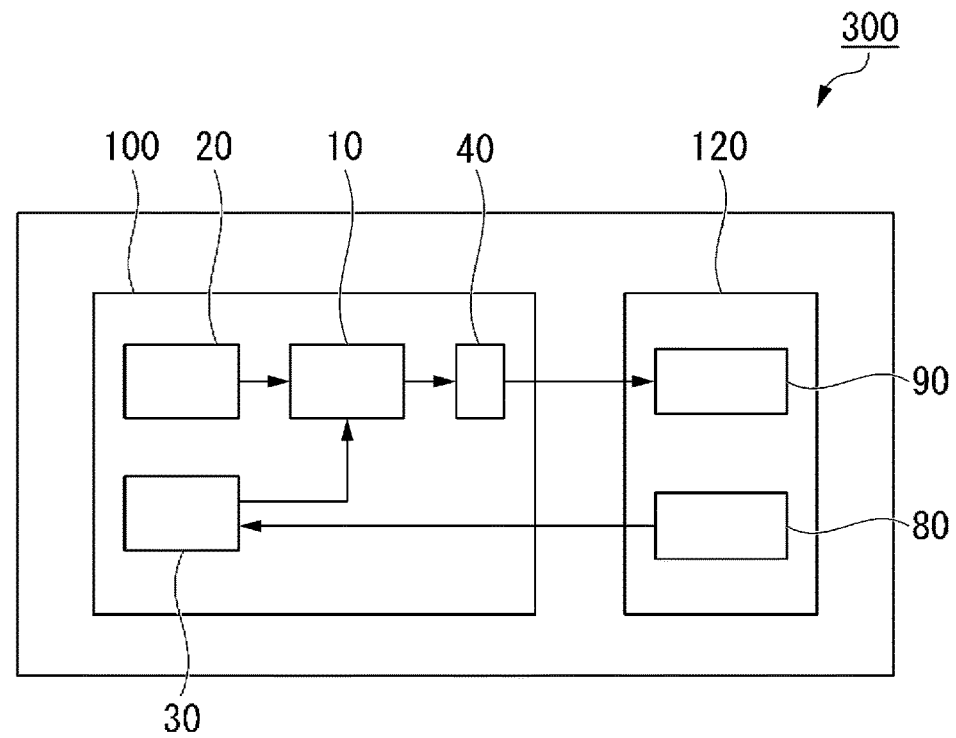
[FIG. 8]
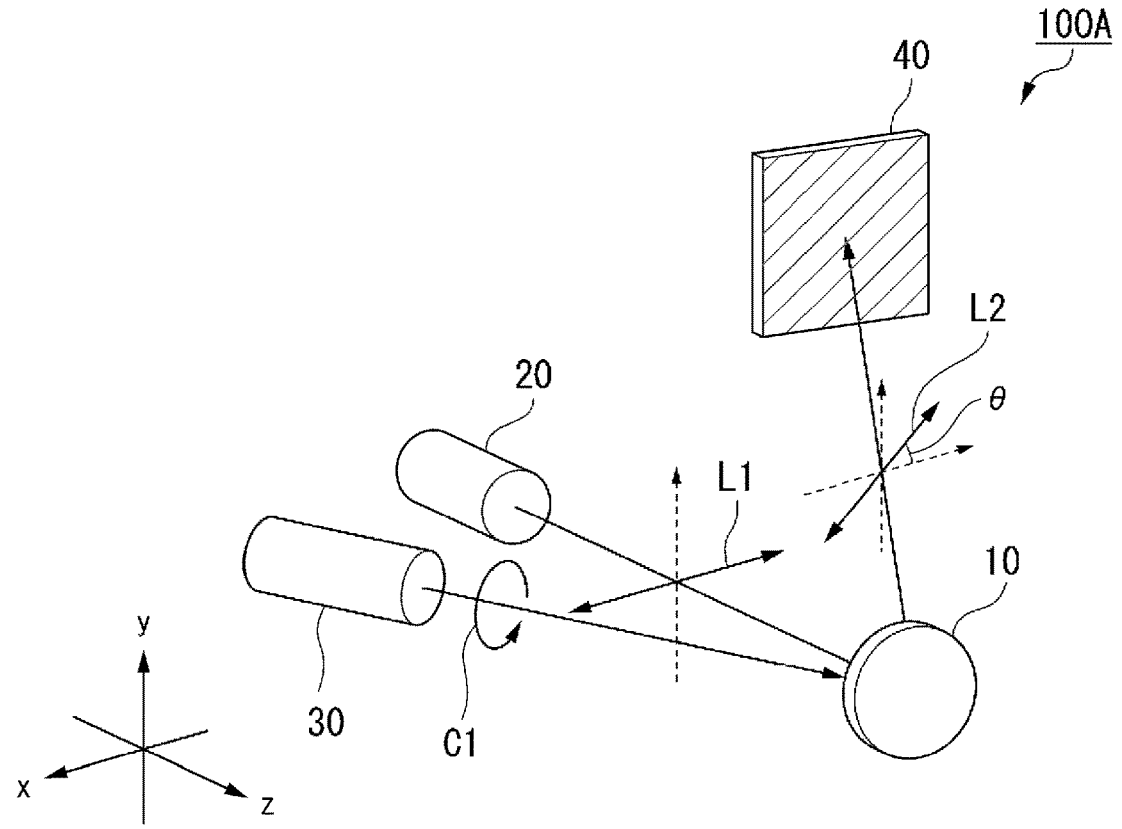

[FIG. 9]
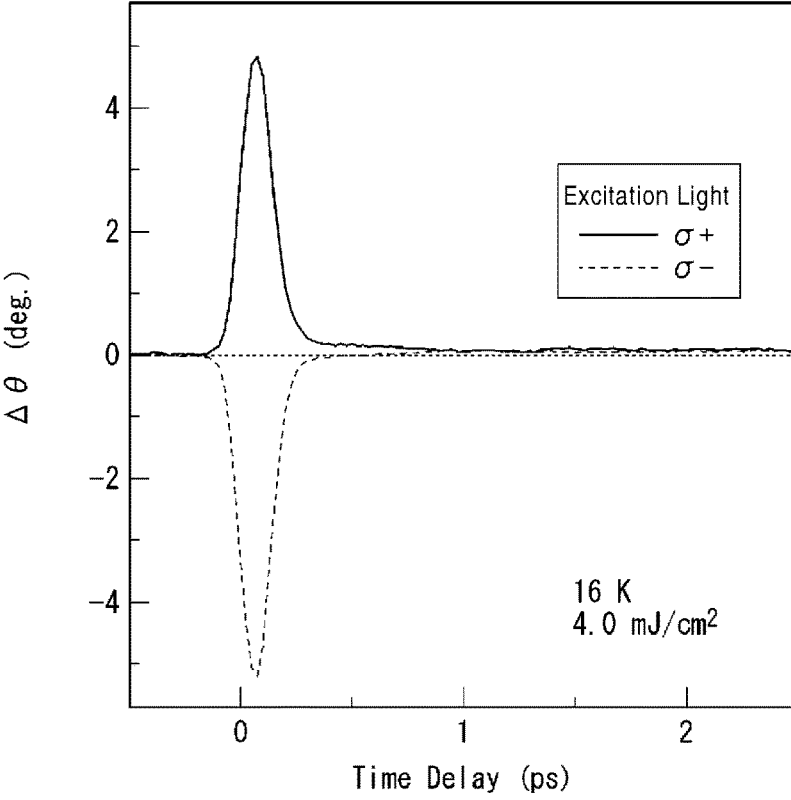
[FIG. 10]
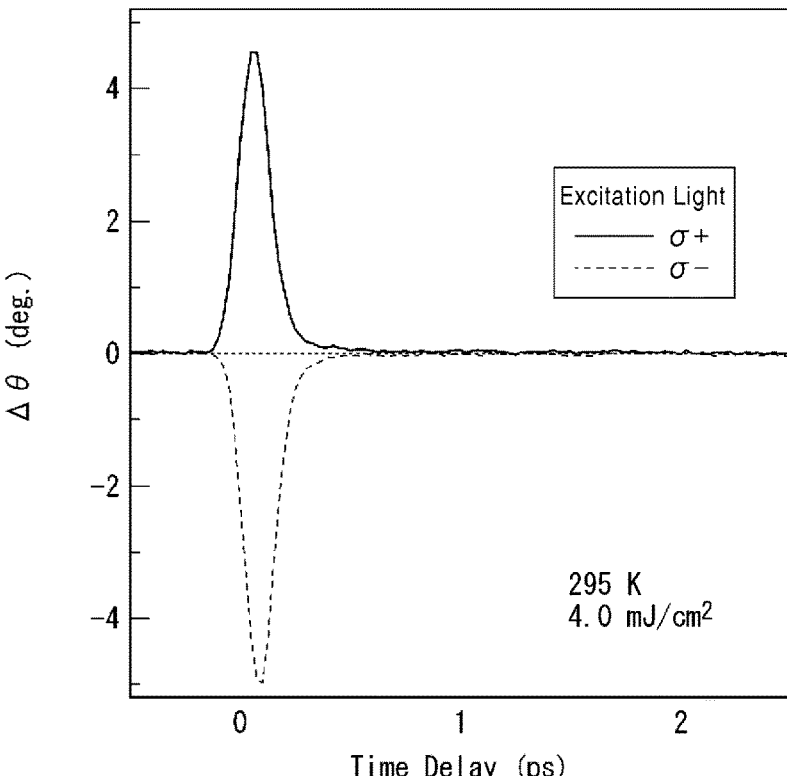

[FIG. 11]
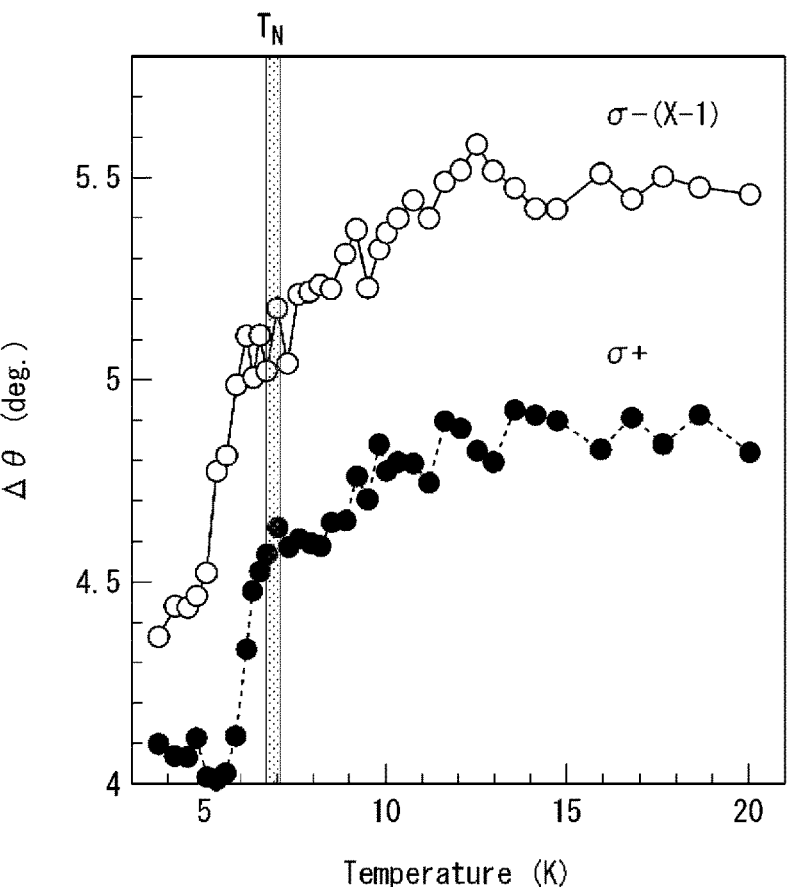
[FIG. 12]
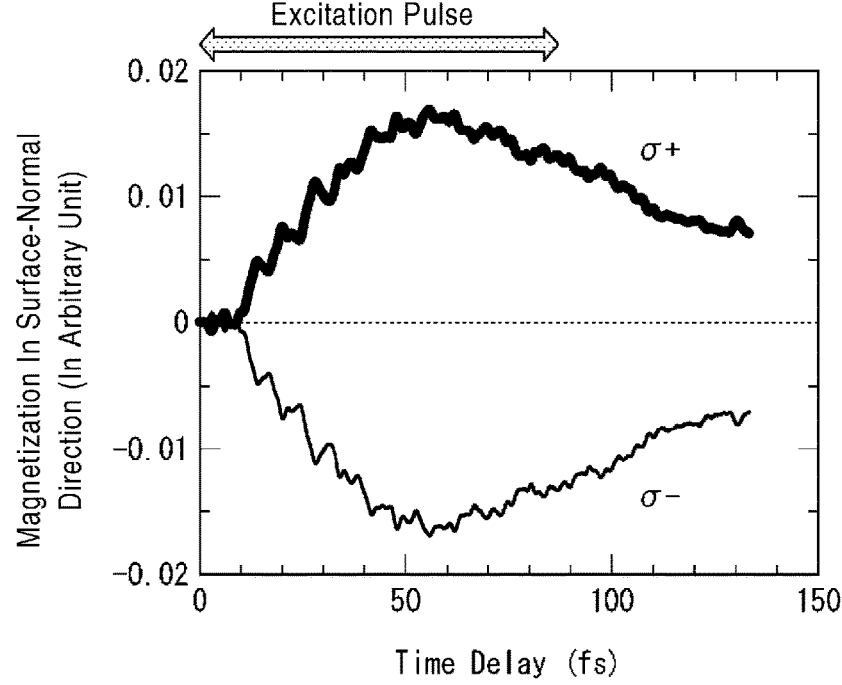

[FIG. 13]
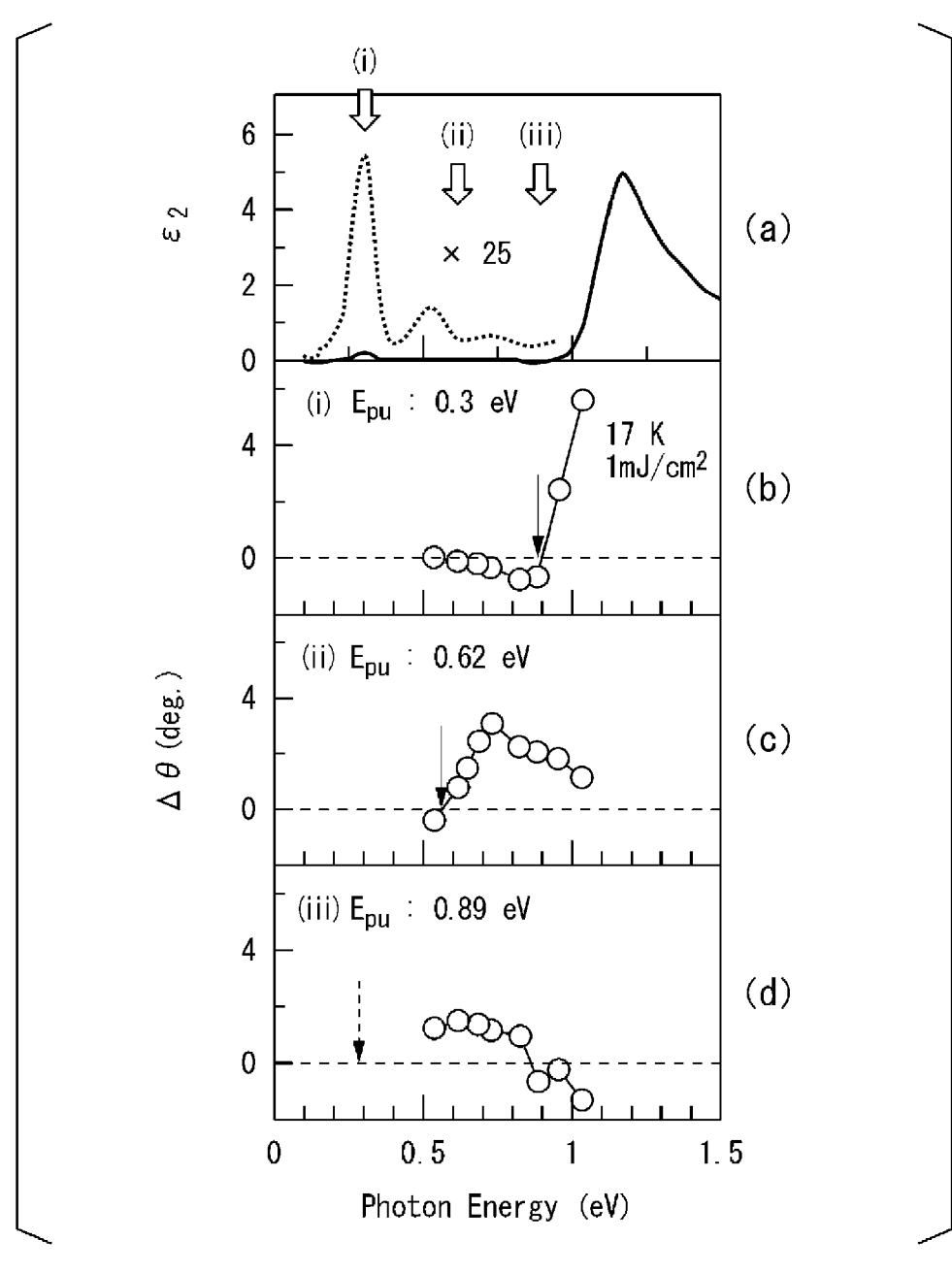

[FIG. 14]
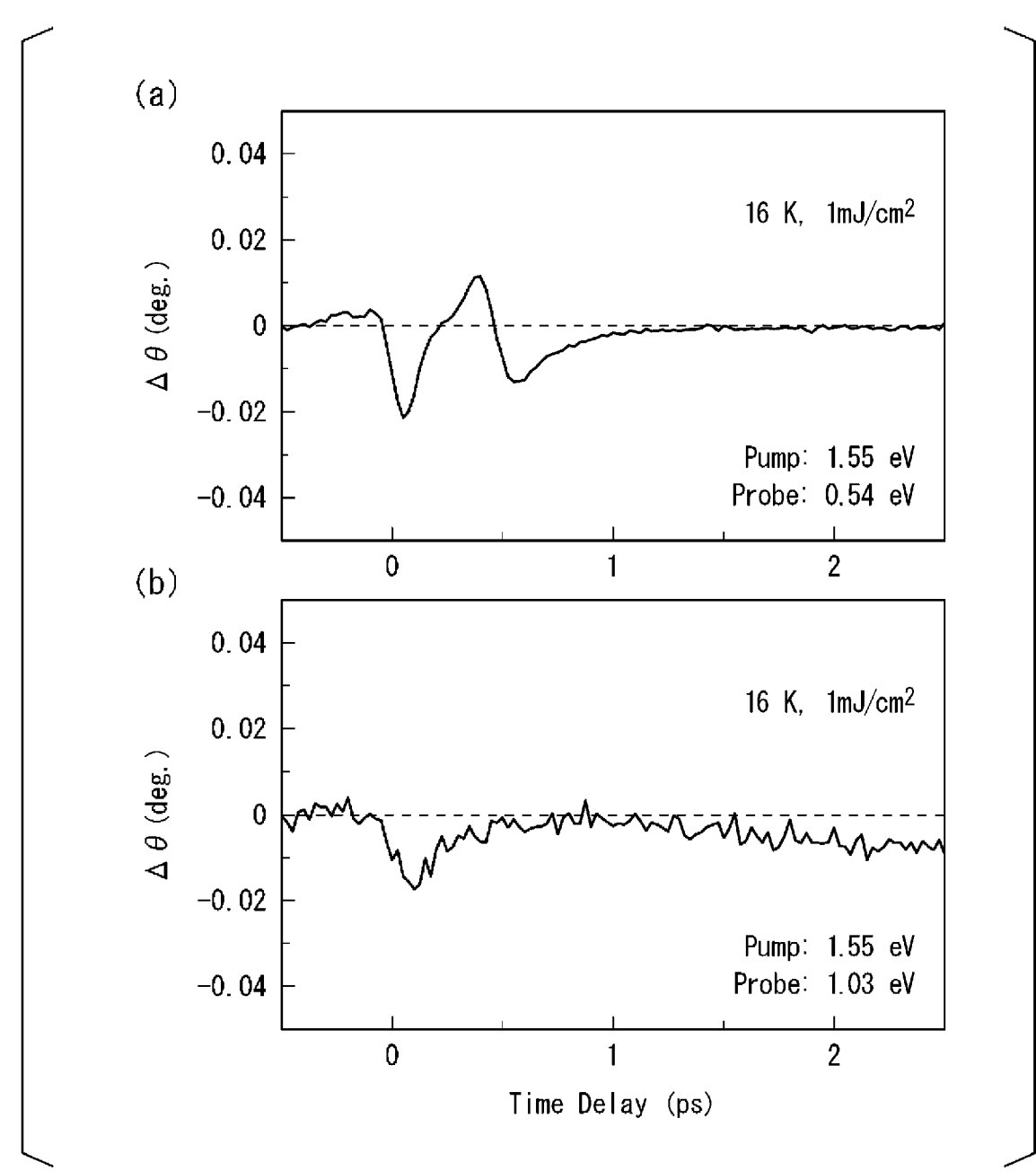

OPTICAL SWITCH ELEMENT, OPTICAL SWITCH DEVICE, OPTICAL COMMUNICATION SYSTEM, AND OPTICAL COMPUTER

CROSS REFERENCE TO RELATED APPLICATIONS

This application is a National Stage of International Application No. PCT/JP2021/044368 filed Dec. 2, 2021, claiming priority based on Japanese Patent Application No. 2020-203352 filed Dec. 8, 2020, the content of which is incorporated herein by reference.

TECHNICAL FIELD

The present invention relates to an optical switch element, an optical switch device, an optical communication system, and an optical computer.

BACKGROUND ART

Recently, elements utilizing spins of a substance have been attracting attention. A magneto-optical switch is an example of the element utilizing the spins. The magneto-optical switch is a switch utilizing the property that emission of a circular polarized light pulse onto a substance with a magnetic order such as an antiferromagnet or a weak ferromagnet results in a change in optical rotation. PTL 1 describes a magneto-optical switch utilizing a magneto-optical effect for example.

CITATION LIST

Patent Literature

PTL 1: JP2009-538490A

SUMMARY OF INVENTION

Technical Problem

The magneto-optical switch described in PTL 1 requires spins of adjacent sublattices to have a magnetic order. This is because the magneto-optical switch described in PTL 1 utilizes the inverse Faraday effect. The inverse Faraday effect has been regarded as a phenomenon limited to magnetic substances (antiferromagnets and weak ferromagnets for example) with a long-range magnetic order. With the inverse Faraday effect of such antiferromagnets and weak ferromagnets, orbital movement of electrons excited by circular polarized light, through the spin-orbit interaction, results in apparent magnetization in the substance. Thus, the magneto-optical switch described in PTL 1 can only operate at a temperature not exceeding the Néel temperature $T_N$ or the Curie temperature $T_c$, at which the antiferromagnet, the weak ferromagnet, or the like has a long-range magnetic order. Unfortunately, many magnetic substances have an extremely low Néel temperature $T_N$ or Curie temperature $T_c$ (not higher than 7 K for example). The magneto-optical switch described in PTL 1 uses a substance with a relatively high Curie temperature, but is still only usable within a limited temperature range.

The present invention is made in view of the problem described above, and an object of the present invention is to provide an optical switch element, an optical switch device, an optical communication system, and an optical computer operable even in a temperature range higher than the Néel temperature.

Solution to Problem

The present invention provides the following means to solve the problem described above.

(1) An optical switch element according to a first aspect includes a substance including a plurality of transition metal elements having electrons in d-orbitals, and a plurality of anions arranged around each of the plurality of transition metal elements, in which the plurality of transition metal elements are arranged in a lattice form, $t_{2g}$-orbitals into which the d-orbitals of each of the plurality of transition metal elements are split are connected annularly, and in a state in which the substance does not have a long-range magnetic order, polarization of signal light is rotated when control light is applied.

(2) In the optical switch element according to the aspect described above, the plurality of transition metal elements may be arranged in any one of a honeycomb lattice form, a triangular lattice form, and a kagome lattice form.

(3) In the optical switch element according to the aspect described above, the substance may be $\alpha$-RuCl$_3$.

(4) In the optical switch element according to the aspect described above, the control light may have a wavelength of 1 μm or more.

(5) An optical switch device according to a second aspect includes the optical switch element according to the aspect described above, a light source that irradiates the optical switch element with the signal light, a control element that irradiates the optical switch element with the control light, and a polarizing plate that polarizes light transmitted through or reflected by the optical switch element.

(6) An optical communication system according to a third aspect includes the optical switch device according to the aspect described above.

(7) An optical computer according to a fourth aspect includes the optical switch device according to the aspect described above.

Advantageous Effects of Invention

The optical switch element, the optical switch device, the optical communication system, and the optical computer according to the aspects described above are operable even in a temperature range higher than the Néel temperature.

BRIEF DESCRIPTION OF DRAWINGS

FIG. 1 is a perspective view of an optical switch device according to a first embodiment.

FIG. 2 illustrates an example of a crystal structure (or atomic arrangement) in a substance forming an optical switch element according to the first embodiment.

FIG. 3 is a schematic view illustrating crystal field splitting.

FIG. 4 illustrates a charge distribution of $t_{2g}$-orbitals as a result of splitting d-orbitals of a transition metal element.

FIG. 5 illustrates spin states in a temperature range lower than the Néel temperature of $\alpha$-RuCl$_3$.

FIG. 6 is a block diagram of an optical communication system according to the first embodiment.

FIG. 7 is a block diagram of an optical computer according to the first embodiment.

FIG. 8 is a perspective view of an optical switch device according to a first modification.

FIG. 9 illustrates a temporal change in polarization rotation caused by circular polarized light excitation in an optical switch element of Example 1.

FIG. 10 illustrates a temporal change in polarization rotation caused by circular polarized light excitation in an optical switch element of Example 2.

FIG. 11 illustrates measurement results of Example 3, and illustrates temperature dependence of a maximum value of a rotation angle of polarization rotation caused by circular polarized light excitation.

FIG. 12 illustrates a temporal change in a surface-normal component of magnetization in $\alpha$-RuCl$_3$ caused by circular polarized light excitation obtained by a theoretical calculation in Example 4.

FIG. 13 illustrates measurement results of Example 5.

FIG. 14 illustrates a temporal change in a rotation angle of a polarization direction, as a result of changing photon energy of control light to 1.55 eV (wavelength: 800 nm).

DESCRIPTION OF EMBODIMENTS

The present embodiment will be described below by referring to the drawings as appropriate. The diagrams used in the following description may have a characteristic part enlarged for the sake of easier understanding of the characteristics of the present invention, meaning that the dimension ratio among components and the like may be different from the actual ratio. The materials, dimensions, and the like in the following description are merely an example. Thus, the present invention is not limited thereto, and can be embodied with an appropriate change made without departing from the gist of the present invention.

First of all, directions will be defined. A traveling direction of signal light L1 emitted from a light source 20 is defined as a z direction. One direction within a plane orthogonal to the z direction is defined as an x direction. A direction orthogonal to the z direction and the x direction is defined as a y direction. In a crystal structure forming a substance, a crystal growth direction is defined as a c-axis direction. Directions orthogonal to the c-axis direction are defined as an a-axis direction and a b-axis direction. The c-axis direction may be aligned with the z direction for example. The a-axis direction may be aligned with the x direction for example. The b-axis direction may be aligned with the y direction for example. Furthermore, the a-axis direction may be aligned with the $(x,y,z)=(1,1,-2)$ direction for example, the b-axis direction may be aligned with the $(x,y,z)=(-1,1,0)$ direction for example, and the c-axis direction may be aligned with $(x,y,z)=(1,1,1)$ for example.

FIG. 1 is a perspective view of an optical switch device 100 according to a first embodiment. The optical switch device 100 includes an optical switch element 10, the light source 20, a control element 30, and a polarizing plate 40. The optical switch device 100 uses control light C1 emitted from the control element 30 to the optical switch element 10, to rotate a polarization direction of the signal light L1 emitted from the light source 20, thereby changing the intensity of light passing through the polarizing plate 40.

The light source 20 is a light source that irradiates the optical switch element 10 with the signal light L1. The control element 30 is a light source that irradiates the optical switch element 10 with the control light C1. Known light sources may be used as the light source 20 and the control element 30. The light source 20 and the control element 30 are laser light sources for example. The signal light L1 is linearly polarized light for example. The control light C1 is circular polarized light. The control light C1 may have any helicity.

The polarizing plate 40 is on the traveling direction of the light transmitted through the optical switch element 10 for example. For the polarizing plate 40, which is a linear polarizing plate for example, a known polarizing plate may be used.

Upon being irradiated with the control light C1, the optical switch element 10 polarizes and rotates the signal light L1. The signal light L1 can be transmitted through the optical switch element 10. The wavelength of the signal light L1 is preferably 1 $\mu$m or more, and more preferably 1.2 $\mu$m or more.

FIG. 2 illustrates an example of a crystal structure of a substance M1 from which the optical switch element according to the first embodiment is made. FIG. 2 illustrates the crystal structure of $\alpha$-RuCl$_3$ that is an example of the substance M1. The optical switch element 10 includes the substance M1 including a plurality of transition metal elements 1 and a plurality of anions 2.

Each of the transition metal elements 1 may be any element having electrons in d-orbitals. The transition metal element 1 is, for example, an element having for example, electrons in 4d-orbitals, examples of which include Y, Zr, Nb, Mo, Tc, Ru, Rh, Pd, Ag, and Cd. In FIG. 2, the transition metal element 1 is Ru. The plurality of transition metal elements 1 are arranged in a lattice form. The plurality of transition metal elements 1 are arranged in, for example, a two-dimensional lattice form. Specifically, for example, the plurality of transition metal elements 1 may be arranged in any one of a honeycomb lattice form, a triangular lattice form, and a kagome lattice form. The shape of a unit cell of the two-dimensional lattice may be triangle, tetragon (square, rectangular, parallelogram, or rhombus), hexagon, or the like. The plurality of transition metal elements 1 are especially preferably arranged in a honeycomb form. In FIG. 2, the transition metal elements 1 are connected in a honeycomb lattice form.

The plurality of anions 2 surround each of the transition metal elements 1. The plurality of anions 2 are arranged in a lattice form each cell of which has the transition metal element 1 provided at the center position. The anions 2 are arranged in, for example, a honeycomb lattice form, a triangular lattice form, or a kagome lattice form, and are preferably arranged in a honeycomb lattice form. Each of the anions 2 is, for example, a chloride ion (Cl$^-$) or an oxide ion (O$^{2-}$). In FIG. 2, the anion 2 is Cl$^-$.

The substance M1 used for the optical switch element 10 is, for example, $\alpha$-RuCl$_3$, Na$_2$IrO$_3$, LizIrO$_3$, Bi$_3$Mn$_4$O$_{12}$ (NO$_3$). ZnCu$_3$(OH$_6$Cl$_2$), or a transition metal chalcogenide.

FIG. 3 illustrates an example of a positional relationship between one transition metal element 1 in the substance and the anions 2 around the transition metal element 1. FIG. 3 is a schematic view illustrating crystal field splitting. The anions 2 are at the vertex positions of an octahedron with the transition metal element 1 at the center. When the anions 2 are at the vertex positions of the octahedron containing the transition metal element 1, crystal field splitting of the d-orbitals occurs. With an octahedral crystal field formed by p-orbitals of the anions 2, five-fold degenerate d-orbitals of the transition metal elements 1 are split into two-fold degenerate $e_g$-orbitals and three-fold degenerate $t_{2g}$-orbitals. The $t_{2g}$-orbitals have three orbital degrees of freedom $d_{xy}$, $d_{yz}$, and $d_{zx}$. While the case where the anions 2 are at the vertex positions of the octahedron containing the transition metal element 1 is described as an example herein, the d-orbitals are split into the $e_g$-orbitals and the $t_{2g}$-orbitals by crystal field splitting also in a case where the anions are at the vertex positions of a tetrahedron.

FIG. 4 illustrates a distribution of the $t_{2g}$-orbitals as a result of the splitting of the d-orbitals of the transition metal elements 1. In FIG. 4, only the transition metal elements 1 are illustrated, with the anions 2 omitted. The $t_{2g}$-orbitals as a result of splitting the d-orbitals of the transition metal elements 1 are connected in a lattice form corresponding to the arrangement of the transition metal elements 1. The $t_{2g}$-orbitals are, for example, connected in a honeycomb lattice form, a triangular lattice form, or a kagome lattice form. The $t_{2g}$-orbitals are, for example, preferably connected in a honeycomb lattice form. The $t_{2g}$-orbitals connected in a lattice form are formed by a unit structure of a plurality of $t_{2g}$-orbitals connected annularly. When the $t_{2g}$-orbitals are connected in a honeycomb lattice form, the unit structure of the $t_{2g}$-orbitals connected annularly has a hexagonal shape. When the $t_{2g}$-orbitals are in a honeycomb lattice form, annular propagation of the electrons excited by the control light C1, which is circular polarized light, is facilitated. Thus, the electrons propagate smoothly, whereby the efficiency of the magnetization occurrence described below is improved.

Here, "$t_{2g}$-orbitals are connected" is not limited to complete connection between electron clouds of the respective d-orbitals, and it suffices if the electrons of the $t_{2g}$-orbitals of a certain transition metal element 1 can propagate to the $t_{2g}$-orbitals of another transition metal element 1. For example, electrons of the $t_{2g}$-orbitals of a certain transition metal element 1 may propagate by hopping to the $t_{2g}$-orbitals of another transition metal element 1.

When the substance M1 is irradiated with the control light C1, which is circular polarized light, the electrons are excited. The electrons excited propagate by hopping between the $t_{2g}$-orbitals in the respective sites (transition metal elements 1). The $t_{2g}$-orbitals in each site have the orbital degrees of freedom ($d_{xy}$, $d_{yz}$, $d_{zx}$). For example, the electrons thus excited are transferred among the orbitals with different degrees of freedom in the order of $d_{xy}$, $d_{yz}$, $d_{zx}$, and $d_{xy}$, in an annularly twisted manner. When the electrons annularly propagate among the $t_{2g}$-orbitals, orbital angular momentum is produced, and thus magnetization in the c-axis direction occurs. The polarization of the signal light L1 is rotated by the magnetization.

The substance M1 has, for example, no spin long-range order (long-range magnetic order) in a temperature range not lower than the Néel temperature $T_N$. For example, the substance M1 may be a quantum spin liquid having spin short-range order but having no spin long-range order, or may have neither spin long-range order nor short-range order. FIG. 5 illustrates the spin states of $\alpha$-RuCl$_3$ in a temperature range lower than the Néel temperature T N. The $\alpha$-RuCl$_3$ has an antiferromagnetic order (long-range order) with first spins sp1 oriented in a first direction and second spins sp2 oriented in a second direction that is a direction different from the first direction, arranged in a zigzag form in the temperature range lower than the Néel temperature $T_N$ ($T_N$=7 K), and has no magnetic order (long-range order) in the temperature range not lower than the Néel temperature $T_N$.

Next, an operation of the optical switch device 100 will be described. To begin with, the optical switch element 10 is irradiated with the signal light L1. The signal light L1 is transmitted through the optical switch element 10 and reaches the polarizing plate 40. In a state in which the optical switch element 10 is not irradiated with the control light C1, the polarization state of the signal light L1 does not change.

Then, the optical switch element 10 is irradiated with the control light C1, which is circular polarized light. The wavelength of the control light C1 is preferably 1 μm or more, and is more preferably 1.2 μm or more for example. With the control light C1 with a wavelength of infrared light, the polarization direction is rotated with higher efficiency compared with the control light C1 with a wavelength of visible light.

When the optical switch element 10 is irradiated with the control light C1, the electrons are excited in the substance M1. The electrons excited, for example, are transferred among the orbitals of different degrees of freedom in the order of $d_{xy}$, $d_{yz}$, $d_{zx}$, and $d_{xy}$ in an annularly twisted manner. When the electrons annularly propagate among the $t_{2g}$-orbitals, orbital angular momentum is produced, and thus magnetization in the c-axis direction occurs. When the magnetization occurs in the substance M1, the signal light L1 turns into signal light L2 by passing through the optical switch element 10. The signal light L2 has the polarization direction rotated from that of the signal light L1. The angle between the signal light L2 and the signal light L1 is referred to as a rotation angle θ. The direction of the polarization rotation changes depending on the helicity of the circular polarized light (clockwise σ⁺ or counterclockwise σ⁻). The clockwise σ⁺ helicity of the circular polarized light leads to counterclockwise rotation, and the counterclockwise σ⁻ helicity of the circular polarized light leads to clockwise rotation. The rotation angle θ changes depending on the thickness of the optical switching element 10 in the z direction and on the intensity of the control light C1. A larger thickness of the optical switching element 10 in the z direction leads to a larger rotation angle θ. A higher intensity of the control light C1 leads to a larger rotation angle θ of the optical switching element 10.

When the polarization direction through which the polarizing plate 40 can allow light transmission is aligned with that of the signal light L2, a large amount of the control light C1 emitted is transmitted through the polarizing plate 40. When the polarization direction through which the polarizing plate 40 can allow light transmission is aligned with that of the signal light L1, a small amount of the control light C1 emitted is transmitted through the polarizing plate 40. The optical switch device 100 performs a switching operation in such a manner that the amount of transmitted light that is not smaller than a threshold leads to "ON", and the amount of transmitted light that is not larger than the threshold leads to "OFF".

With the optical switch device 100 according to the first embodiment, the electrons excited are transferred among the orbitals with different degrees of freedom in an annularly twisted manner, whereby the orbital angular momentum is produced, resulting in rotation of the polarization direction of the signal light L1. This principle works even with a state (phase) without the long-range magnetic order, unlike with the conventional magneto-optical effect utilizing the inverse Faraday effect. Thus, the optical switch device 100 according to the first embodiment can perform an optical switching operation with the control light C1 regardless of the Néel temperature $T_N$. In principle, the magneto-optical switch utilizing the inverse Faraday effect can only operate at a temperature lower than the Néel temperature $T_N$. Thus, the optical switch device 100 according to the first embodiment that operates at a temperature not lower than the Néel temperature $T_N$ can be regarded as operating under a new principle.

The optical switch device 100 according to the first embodiment can be used for an optical communication system, an optical computer, and the like.

FIG. 6 is a block diagram of an optical communication system 200 according to the first embodiment. The optical communication system 200 includes a plurality of transmission/reception devices 110. The transmission/reception devices 110 each include a transmission device 101 and a reception device 102. The transmission device 101 includes a signal generation unit 50 and the optical switch device 100. The reception device 102 includes a photoelectric conversion element 60 and a signal processing element 70.

The signal generation unit 50 generates a digital signal. The control element 30 irradiates the optical switch element 10 with the control light C1, based on the signal input from the signal generation unit 50. The optical switch element 10 rotates the polarization direction of the signal light L1 emitted from the light source 20, based on the control light C1. The intensity of light emitted from the optical switch device 100 varies based on the level of alignment between the polarization direction through which the polarizing plate 40 can allow passage and the polarization direction of the signal light. Thus, the transmission device 101 converts a digital signal (for example, "1" 0" "1" "0") generated by the signal generation unit 50 into an optical signal (for example, "ON" OFF" "ON" "OFF").

The reception device 102 receives the optical signal emitted from the transmission device 101. The optical signal is converted into an electric signal by the photoelectric conversion element 60, and then is processed by the signal processing element 70.

FIG. 7 is a block diagram of an optical computer 300 according to the first embodiment. The optical computer 300 includes, for example, the optical switch device 100 and an integrated circuit 120. The integrated circuit 120 includes a storage unit 80 and a signal processing unit 90. Information stored in the storage unit 80 is transmitted to the control element 30. The control element 30 emits the control light C1 based on the information stored in the storage unit 80. The signal processing unit 90 executes processing based on the optical signal emitted from the optical switch device 100.

While one embodiment of the optical switch device 100 is described above as an example, the present invention is not limited to this embodiment. For example, as illustrated in FIG. 8, reflected light reflected on the optical switch element 10 may be incident on the polarizing plate 40. FIG. 8 is a perspective view of an optical switch device 100A according to a first modification.

EXAMPLES

Example 1

With $\alpha$-RuCl$_3$ used for the optical switch element 10, the polarization rotation of light was examined. The thickness of the optical switching element 10 in the z direction was 50 $\mu$m. In Example 1, the optical switch element 10 was irradiated with circular polarized light, and the light transmitted through the optical switch element 10 and emitted was measured. Then, the rotation angle $\theta$ between the polarization direction of the light incident on the optical switch element 10 and the polarization direction of the light emitted was obtained.

As the control light C1 incident on the optical switch element 10, a circular polarized light pulse having an intensity of 4.0 mJ/cm$^2$ and a pulse width of 200 fsec was used. The photon energy of the circular polarized light pulse was 0.89 eV (wavelength: 1.4 $\mu$m). Each of the clockwise $\sigma^+$ and the counterclockwise $\sigma^-$ helicities of the circular polarized light was used. The signal light L1 with which the optical switch element 10 was irradiated was linearly polarized probe light. The signal light L1 had a photon energy of 0.62 eV (wavelength: 2.0 $\mu$m). The measurement temperature was 16 K.

FIG. 9 illustrates a temporal change in the polarization rotation caused by circular polarized light excitation in the optical switch element of Example 1. As illustrated in FIG. 9, $\alpha$-RuCl$_3$ caused polarization rotation in response to the irradiation with the control light C1. The rotation angle $\theta$ of the polarization rotation was 4 degrees or more. The rotation direction of the polarization rotation was dependent on the helicity of the circular polarized light. The measurement temperature, which was 16 K, was higher than the Néel temperature of $\alpha$-RuCl$_3$ (T$_N$=7 K), and the occurrence of an optical switching operation was observed in the quantum spin liquid state having no spin long-range order. Thus, the optical switch element 10 can cause the polarization rotation of the signal light L1, and the optical switch device 100 functions with a polarizing plate inserted on an optical path of the light emitted from the optical switch element 10. In addition, since the optical switch element 10 operates in a pulse width in the unit of femtosecond, the optical switch device 100 can be also used for high-speed communications.

Example 2

Example 2 differs from Example 1 in that the measurement temperature was 295 K. The examination was undertaken with otherwise the same conditions as in Example 1. FIG. 10 illustrates a temporal change in the polarization rotation caused by circular polarized light excitation in an optical switch element of Example 2. Example 2 demonstrated similar results to those in Example 1. As demonstrated in Example 2, the optical switch element was confirmed to be also operable at room temperature.

Example 3

Example 3 differs from Example 1 in that the temperature dependence of the maximum value of the rotation angle $\theta$ of the polarization rotation due to the excitation of the circular polarized light was measured at varying measurement temperatures. The examination was undertaken with the other conditions remaining similar to those in Example 1. FIG. 11 illustrates measurement results of Example 3.

As illustrated in FIG. 11, $\alpha$-RuCl$_3$ caused polarization rotation at any of the temperatures. Meanwhile, the rotation angle $\theta$ of the polarization rotation caused by $\alpha$-RuCl$_3$ was large at a temperature not lower than the Néel temperature T$_N$. Thus, the long-range magnetic order in the in-plane direction as illustrated in FIG. 5 can be regarded as inhibiting the polarization rotation. In the case with the conventional magneto-optical switch utilizing the inverse Faraday effect, polarization rotation occurs at a temperature lower than the Néel temperature T$_N$, and does not occur at a temperature not lower than the Néel temperature T$_N$. Thus, the phenomenon illustrated in FIG. 11 represents a behavior opposite to that with the conventional magneto-optical switch utilizing the inverse Faraday effect, whereby the polarization rotation can be regarded as occurring under a new principle.

Example 4

In Example 4, a mechanism of photoinduced magnetization in $\alpha$-RuCl$_3$ was examined through a theoretical analysis taking the quantum many-body effect into consideration. Specifically, the examination was performed under conditions with $t_{2g}$-orbitals ($d_{yz}$, $d_{xz}$, $d_{xy}$-orbitals) of the honeycomb lattice as illustrated in FIG. 4 having onsite electron-electron interactions and spin-orbit interactions, and with transfer integrals only between the nearest-neighbor sites. The numerical calculation was performed through exact-diagonalization on a six-site periodic system having three-fold symmetry. The numerical calculation was performed using a light irradiation effect in an electron state obtained by the exact-diagonalization, based on the time-dependent Schrödinger equation. Light excitation was introduced through a Peierls phase, and the excitation energy was below the Mott gap as in Example 1.

FIG. 12 illustrates a temporal change in the surface-normal component of magnetization in $\alpha$-$RuCl_3$ caused by circular polarized light excitation obtained by the theoretical calculation in Example 4. As illustrated in FIG. 12, it was also theoretically confirmed that inverse surface-normal magnetization occurred in accordance with the helicity of the circular polarized light. As a result of the theoretical calculation, it was found that this surface-normal component of the magnetization was caused by excited electrons transferring among orbitals having different degrees of freedom in an annularly twisted manner (for example, in the order of $d_{xy}$, $d_{yz}$, $d_{zx}$, and $d_{xy}$) by hopping among the sites on the honeycomb lattice.

Example 5

Example 5 differs from Example 1 in that the behavior of the polarization rotation due to the excitation of the circular polarized light was measured with varying wavelengths of the signal light L1 and the control light C1.

FIG. 13 illustrates measurement results of Example 5. FIG. 13($a$) represents the absorption wavelength of $\alpha$-$RuCl_3$ (optical switching element 10). FIG. 13($a$) is based on FIG. 1($a$) and FIG. 4($a$) in L. J. Sandilands et al., Phys. Rev. B 93, 075144 (2016). The solid-line graph and the dotted-line graph illustrated in FIG. 13($a$) each indicate absorption by $\alpha$-$RuCl_3$. The dotted-line graph is a 2500% enlarged version of the solid-line graph in a region with a photon energy of 1.0 eV or less (wavelength: 1.24 μm or more).

FIGS. 13($b$) to 13($d$) illustrate changes in the rotation angle $\theta$ as a result of irradiating the optical switching element 10 with the control light C1 having different photon energies (Epu). FIG. 13($b$) illustrates a result with the control light C1 having a photon energy of 0.3 eV (wavelength: 3.8 μm). FIG. 13($c$) illustrates a result with the control light C1 having a photon energy of 0.62 eV (wavelength: 2.0 μm). FIG. 13($d$) illustrates a result with the control light C1 having a photon energy of 0.89 eV (wavelength: 1.4 μm). The horizontal axes in FIGS. 13($b$) to 13($d$) represent the photon energy of the signal light L1, whereas the vertical axes represent the rotation angle $\theta$. As the control light C1, a circular polarized light pulse having an intensity of 1.0 $mJ/cm^2$ and a pulse width of 200 fsec was used.

As illustrated in FIGS. 13($b$) to 13($d$), it was confirmed that an optical switching operation occurs even when the wavelength of the signal light L1 and the control light C1 varies.

FIG. 14 illustrates a temporal change in the rotation angle $\theta$ of the polarization direction, as a result of changing the photon energy of the control light C1 to 1.55 eV (wavelength: 800 nm). $\alpha$-$RuCl_3$ absorbs a larger amount of light in a region with a photon energy of 1.55 eV than in the region with a photon energy of 1.0 eV or less (refer to FIG. 13($a$)).

FIG. 14($a$) illustrates a result with the signal light L1 having a photon energy of 0.54 eV (wavelength: 2.3 μm), and FIG. 14($b$) illustrates a result with the signal light L1 having a photon energy of 1.03 eV (wavelength: 1.2 μm). The horizontal axes in FIG. 14 represent the elapsed time after irradiation with the control light C1, whereas the vertical axes represent the rotation angle $\theta$. As the control light C1, a circular polarized light pulse having an intensity of 1.0 $mJ/cm^2$ and a pulse width of 200 fsec was used.

As illustrated in FIG. 14, the rotation angle $\theta$ changed as a result of the irradiation with the control light C1. Meanwhile, the rotation angle was smaller than those in the experimental results (FIGS. 13($b$) to 13($d$)) in the region with a photon energy of 1.0 eV or less.

REFERENCE SIGNS LIST

1: transition metal element
2: anion
10: optical switch element
20: light source
30: control element
40: polarizing plate
50: signal generation unit
60: photoelectric conversion element
70: signal processing element
80: storage unit
90: signal processing unit
100, 100A: optical switch device
101: transmission device
102: reception device
110: transmission/reception device
120: integrated circuit
200: optical communication system
300: optical computer
C1: control light
L1, L2: signal light
sp1: first spin
sp2: second spin
$\theta$: rotation angle

The invention claimed is:
1. An optical switch device comprising:
an optical switch element;
a light source that irradiates the optical switch element with the signal light;
a control element that irradiates the optical switch element with the control light; and
a polarizing plate that polarizes light transmitted through or reflected by the optical switch element,
wherein the optical switch element comprises a substance including a plurality of transition metal elements having electrons in d-orbitals, and a plurality of anions arranged around each of the plurality of transition metal elements,
the plurality of transition metal elements are arranged in a lattice form, $t_{2g}$-orbitals into which the d-orbitals of each of the plurality of transition metal elements are split are connected annularly,
in a state in which the substance does not have a long-range magnetic order, the polarization of signal light is rotated when control light is applied, and
the control light has a wavelength of 1.2 μm or more.

2. The optical switch device according to claim 1, wherein the plurality of transition metal elements are arranged in any one of a honeycomb lattice form, a triangular lattice form, and a kagome lattice form.

3. The optical switch device according to claim 1, wherein the substance is $\alpha$-RuCl$_3$.

4. The optical switch device according to claim 1, wherein the optical switch element is operable in a temperature range higher than the Néel temperature.

5. The optical switch device according to claim 1, wherein the electrons excited by the control light are configured to transfer among the orbitals with different degrees of freedom in an annularly twisted manner.

6. The optical switch device according to claim 1, wherein the t$_{2g}$-orbitals as a result of splitting the d-orbitals of the transition metal elements are connected in a lattice form corresponding to the arrangement of the transition metal elements.

7. The optical switch device according to claim 1, wherein electron clouds of the t$_{2g}$-orbitals is complete connected in lattice form.

\* \* \* \* \*